(12) United States Patent
DiPaolo

(10) Patent No.: US 9,480,341 B2
(45) Date of Patent: Nov. 1, 2016

(54) PHYSICAL SUPPORT DEVICE

(71) Applicant: Vincenzo DiPaolo, New Hyde Park, NY (US)

(72) Inventor: Vincenzo DiPaolo, New Hyde Park, NY (US)

( * ) Notice: Subject to any disclaimer, the term of this patent is extended or adjusted under 35 U.S.C. 154(b) by 0 days.

(21) Appl. No.: 14/584,479

(22) Filed: Dec. 29, 2014

(65) Prior Publication Data

US 2016/0183686 A1 Jun. 30, 2016

(51) Int. Cl.
| | | |
|---|---|---|
| *A47C 7/00* | (2006.01) | |
| *A47C 7/54* | (2006.01) | |
| *B60N 2/46* | (2006.01) | |
| *A47C 7/42* | (2006.01) | |
| *A61H 3/02* | (2006.01) | |
| *A61H 3/00* | (2006.01) | |

(52) U.S. Cl.
CPC .............. *A47C 7/546* (2013.01); *A47C 7/425* (2013.01); *A61H 3/02* (2013.01); *A61H 2003/006* (2013.01); *A61H 2003/0233* (2013.01); *B60N 2/46* (2013.01); *B60N 2/464* (2013.01); *B60N 2/468* (2013.01); *B60N 2/4633* (2013.01)

(58) Field of Classification Search
CPC .... A47C 7/425; B60N 2/4633; B60N 2/464; B60N 2/468; B60N 2/46; A61G 7/1019; A61G 7/1092; A61G 2200/34; A61G 2200/36; A61G 2200/52
USPC ................ 297/411.1, 230.11, 230.1, 230.14, 297/411.2, 411.21, 411.31; 135/75, 66, 71, 135/73
See application file for complete search history.

(56) References Cited

U.S. PATENT DOCUMENTS

| | | | | |
|---|---|---|---|---|
| 1,722,205 A | | 7/1929 | Freund | |
| 2,408,604 A | * | 10/1946 | Brickson ................. | A61H 3/02 135/69 |
| 2,700,979 A | * | 2/1955 | Ries ........................ | A61H 3/02 135/69 |
| 2,771,089 A | * | 11/1956 | Magida .................... | A61H 3/02 135/69 |
| 3,289,685 A | * | 12/1966 | McCall ................. | A61H 3/0244 135/65 |
| 3,394,933 A | * | 7/1968 | Benoit ................. | A61G 7/1019 254/4 R |
| 3,531,158 A | * | 9/1970 | Allen ..................... | A47C 16/00 297/411.1 |
| 3,710,807 A | * | 1/1973 | Ferry ....................... | A61H 3/02 135/68 |
| 3,982,531 A | | 9/1976 | Shaffer | |
| 4,151,853 A | * | 5/1979 | Inbar ....................... | A61H 3/02 135/69 |

(Continued)

FOREIGN PATENT DOCUMENTS

WO 2003051159 A1 6/2003

*Primary Examiner* — Chi Q Nguyen
(74) *Attorney, Agent, or Firm* — Florek & Endres PLLC

(57) ABSTRACT

A physical support device used for displacing the weight of the upper torso off of the lower back and ensuring proper posture while a user is seated, comprising a base member to be placed on a surface adjacent a seated user, an arced member to be placed under the user's armpit, a vertical support member having a lower end coupled to the base member and an upper end coupled to the arced member. An adjustment mechanism allows for height adjustment of the vertical support member so that the arced member can fit directly under any user's armpit, where the arced member is able to hold and displace the weight of the user's upper torso off the lower back. A forearm support coupled to the vertical support member further provides comfort and relief to a seated user.

20 Claims, 7 Drawing Sheets

(56) References Cited

U.S. PATENT DOCUMENTS

| | | | |
|---|---|---|---|
| 4,917,126 A * | 4/1990 | Ellmore | A61H 3/02 135/69 |
| 5,139,040 A * | 8/1992 | Kelly | A61H 3/02 135/69 |
| 5,224,924 A | 7/1993 | Urso | |
| 5,277,438 A * | 1/1994 | Chuang | A61H 3/04 135/67 |
| 5,462,518 A | 10/1995 | Hatley et al. | |
| 5,868,694 A * | 2/1999 | Marlow | A61F 5/026 602/19 |
| 5,924,434 A * | 7/1999 | Cato, III | A61H 3/02 135/68 |
| 6,015,395 A * | 1/2000 | Kautzky | A61H 1/0229 602/19 |
| 6,045,519 A | 4/2000 | Smith, Sr. | |
| 6,047,420 A | 4/2000 | Priester, III et al. | |
| 6,085,766 A * | 7/2000 | Geary | A01B 1/00 135/68 |
| 6,206,019 B1 * | 3/2001 | Horvitz | A61H 3/00 135/66 |
| 6,280,405 B1 | 8/2001 | Broselid | |
| 6,834,660 B1 * | 12/2004 | Van Wart, Jr. | A61H 3/02 135/72 |
| 7,416,257 B1 | 8/2008 | Lakhman | |
| 7,422,282 B2 | 9/2008 | Rutty | |
| 8,418,704 B1 * | 4/2013 | Teeters | A61H 3/02 135/69 |
| 2008/0053502 A1 * | 3/2008 | Tseng | A61H 3/02 135/69 |
| 2010/0147313 A1 | 6/2010 | Albrecht | |

* cited by examiner

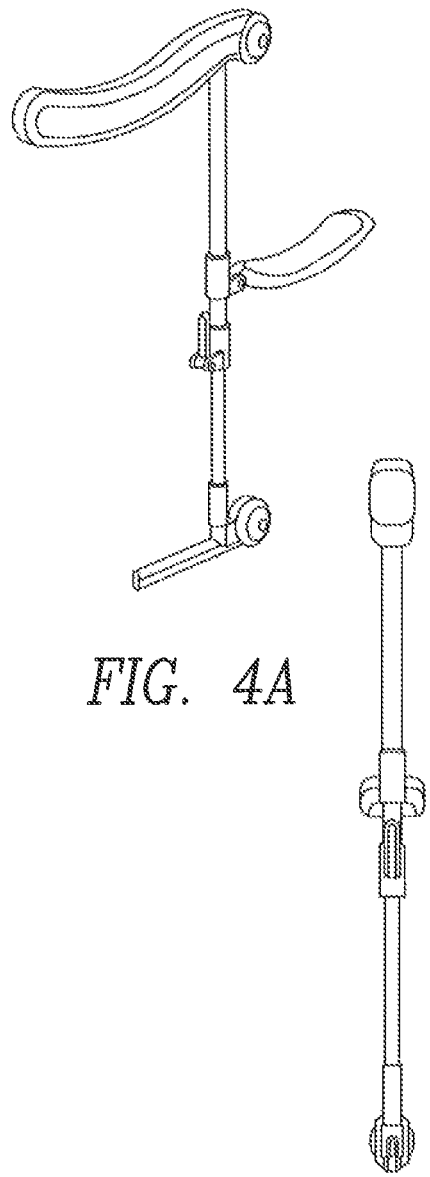
FIG. 4A
FIG. 4B
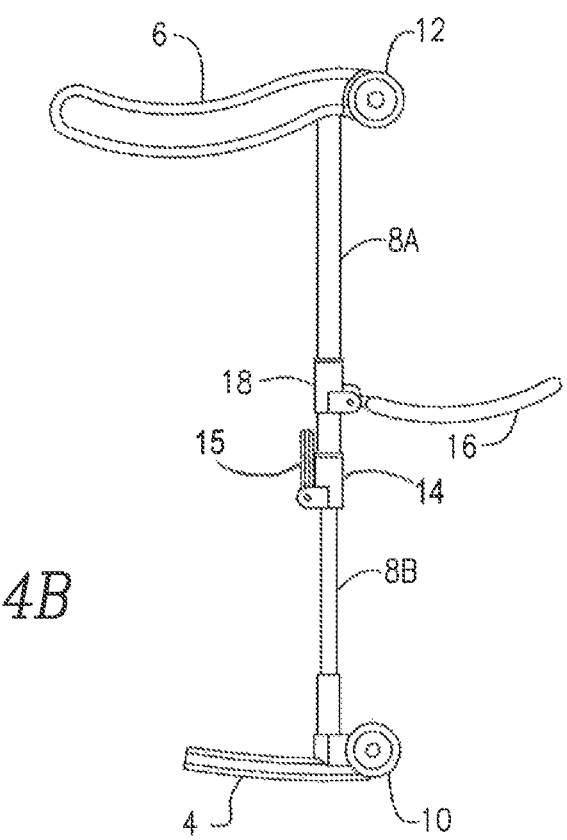
FIG. 4C

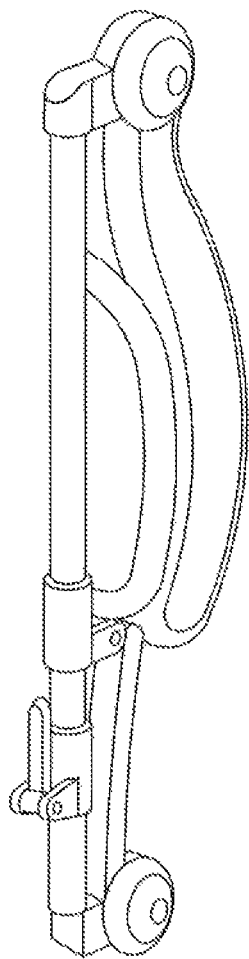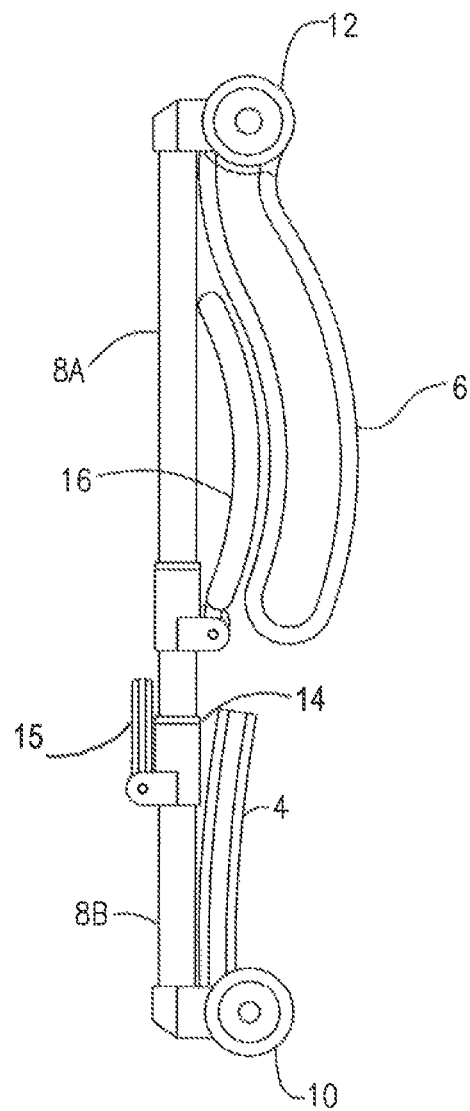
FIG. 5A
FIG. 5B

PHYSICAL SUPPORT DEVICE

FIELD OF THE INVENTION

The present invention relates to the field of devices used to provide physical support, particularly to the field of devices used to provide support and pain relief to a person seated in a substantially upright position.

BACKGROUND OF THE INVENTION

The lower back, or lumbar area, is responsible for many functions including structural support, movement, and protection of certain body tissues, which is why it is extremely important to ensure the lower back has as much support as possible. In addition to tolerating the stress of a person's entire body, the back and the spine are also exposed to other abuses such as poor posture and holding the weight of the upper torso for long periods of time. While people tend to believe that being seated will relieve some of the stresses on the lower back, that is not true without the proper support and posturing.

Several supporting devices have been created in an attempt to solve this frequently occurring problem. One example of a back supporting device is found in U.S. Pat. No. 7,416,257, which shows a substantially horizontally extending support element placeable on a surface level with a sitting person's pelvis, from which two vertically extending elements with a horizontal attachment fittable to a person's underarms extend upward to provide support to a person in a sitting position.

As shown in U.S. Pat. No. 7,422,282, back supporting devices also come in the form of two rigid U-shaped side members that extend out from a frame that is connected, either temporarily or permanently, to the back of a seat back. This device, created specifically for use in conjunction with a seat with a back, attempts to relieve lower back pain by holding some of the person's weight with the U-shaped members that are placed under the seated person's underarms.

Alternatively, devices such as the one found in U.S. Pat. No. 5,462,518 have attempted to alleviate back pain by strengthening of the spine and back muscles. This device comprises a multilayered belt to be strapped around a person's stomach, from which two large spring loaded tube assemblies extend upwards on either side of the torso to sit just beneath the person's underarms. With the longitudinal adjustment of the tubes, the user can vary the degree of pressure and use the device to exercise and strengthen the muscles of the back and torso.

However, there is clearly a need for a less rigid, simple physical support device which displaces the weight of the upper torso and provides both spinal and lower back support that ensures the user is supported in a well aligned upright position, no matter the angle of the seat. There is also a need for a body support device that is more comfortable, which provides support at more than just the armpit.

SUMMARY OF THE INVENTION

In order to overcome the shortcomings of the prior inventions, namely the rigidity of the existing devices and the lack of mobility, comfort, and sufficient support of the lower back and the spine, the present invention is provided as a device, useable with virtually any type of seat consisting of at least a seat base.

It is therefore an object of the present invention to create a single device that will provide physical support to the back and the spine, which is an improvement over the already-existing devices. Another object of the invention is to create a device which can displace the weight of the upper torso and provide adequate support to the lower back while also maintaining the comfort and convenience that is sought by consumers. It is a further object of the invention to provide additional comfort and relief by reducing the weight of a user's arm from the shoulder.

These and other objects are addressed by the present invention, directed to a device for supporting a person in a sitting position, promoting better posture and reducing lower back pain associated with sitting in a seat by way of taking some of the weight of the arm and upper torso off of the lower back, ensuring proper spinal alignment, and alleviating back pain from all sources. More particularly, the present invention is directed to a physical support device, comprising:

a. a base member adapted to be placed on a surface adjacent a seated user;
b. an arced member adapted for placement under the user's armpit;
c. a vertical support member having a lower end coupled to the base member and an upper end coupled to the arced member;
d. an adjustment mechanism to vary the height of the vertical support member; and
e. a forearm rest associated with the vertical support member intermediate the base member and the arced member.

In a preferred embodiment, the base member is coupled to the lower end of the vertical support member with a pivotable first connection member that allows for the movement of the vertical support member in a plane with the base member. This permits at least limited pivotal movement of the vertical support member with respect to the base member so the user need not be rigidly sitting upright the entire time and for ideal back alignment and support no matter the shape or angle of the seat the user is sitting in. The pivotable connection may also allow the base member to fold into parallel alignment with and adjacent to the vertical support member for portability.

In another preferred embodiment, the base member can be fixed to the lower end of the vertical support member. In such an embodiment, the based member preferably has a curved bottom surface that allows the base member to "rock" on the seating surface adjacent to the thigh of a user when the physical support device is in use. Such an arced surface similarly allows the user to reposition themselves slightly backward and forward for comfort while using the physical support device.

In the most preferred embodiment, the vertical support member is comprised of two or more vertical sections, at least two of which are adjustably attached in a manner that permits extension or collapsing for adjusting the height of the arced member relative to the base member. Most preferably, the vertical sections include a locking element as part of or independent from the adjustment mechanism to lock the sections into place at a user determinable height. Such a feature allows the user to lengthen and lock the vertical support member so that the arced member sits just below the underarm, holding up the weight of the user's upper body and thereby alleviating a degree of pressure on the lower back while the user is in a seated position.

The forearm rest is preferably adapted to extend outwardly from the vertical support member. The forearm rest is preferably coupled to the vertical member with a connection that allows for the height adjustment of the forearm rest relative to the base member and/or arced member. This permits the placement of the forearm rest at a height to best relieve the upper torso of the weight of the arm, and for optimal comfort while also allowing for freedom of movement. The connection between the forearm rest and the vertical member is preferably a pivotable connection that provides the folding of the forearm rest against the vertical member for portability or for when the forearm rest is not needed, i.e., while seated at a table. Also preferred, the connection between the forearm rest and the vertical support member permits not only vertical adjustment but also rotational adjustment of the forearm rest about the vertical support member. This permits the user to align the forearm rest with the vertical member in a plane to fold the forearm rest into parallel alignment with the support member for added portability or storage.

Additionally, the support device preferably includes cushioning on one or both of the arced member and the forearm rest to provide comfort to the user. The cushioning may be any suitable material, such as a soft padding made of foam, rubber, silicone, gel, or a like material. Similarly, the base member can be padded or coated to minimize damage to the searing surface on which it sits.

In another preferred embodiment of the physical support device, one or more of the horizontally extending members, i.e. the arced member, the forearm rest, and the base member, are pivotably connected to the vertical support member in a manner that allows the members to fold adjacent the vertical support member in a parallel alignment therewith, forming a compact closed configuration. This permits the convenient storage and/or transport of the physical support device when it is not in use.

Of course, any or all of the horizontally extending members, i.e., the arced member, the forearm rest and the base member, may be coupled directly to the vertical support member in fixed positions, without the use of pivotable connection members. This increases the stability of the horizontally extending members and also provides the user with a strong, simple and easy to use support device.

BRIEF DESCRIPTION OF THE DRAWINGS

The present invention will be better understood when considered in view of the attached drawings, in which like reference characters indicate like parts. The drawings, however, are presented merely to illustrate the preferred embodiment of the invention without limiting the invention in any manner whatsoever.

FIG. 4A shows a perspective view of an alternative preferred embodiment of the present invention.

FIG. 4B shows a front view of the alternative preferred embodiment of FIG. 4A.

FIG. 4C shows a side elevation of the alternative preferred embodiment of FIG. 4A.

FIG. 5A shows a perspective view of the alternative preferred embodiment of FIGS. 4A-C wherein the arced member, forearm rest, and base member are pivotably connected to the vertical support member and folded into a closed configuration.

FIG. 5B shows a side elevation of the alternative preferred embodiment of FIGS. 4A-C wherein the arced member, forearm rest, and base member are pivotably connected to the vertical support member and folded into a closed configuration.

DETAILED DESCRIPTION OF THE PREFERRED EMBODIMENT

Figure 1:
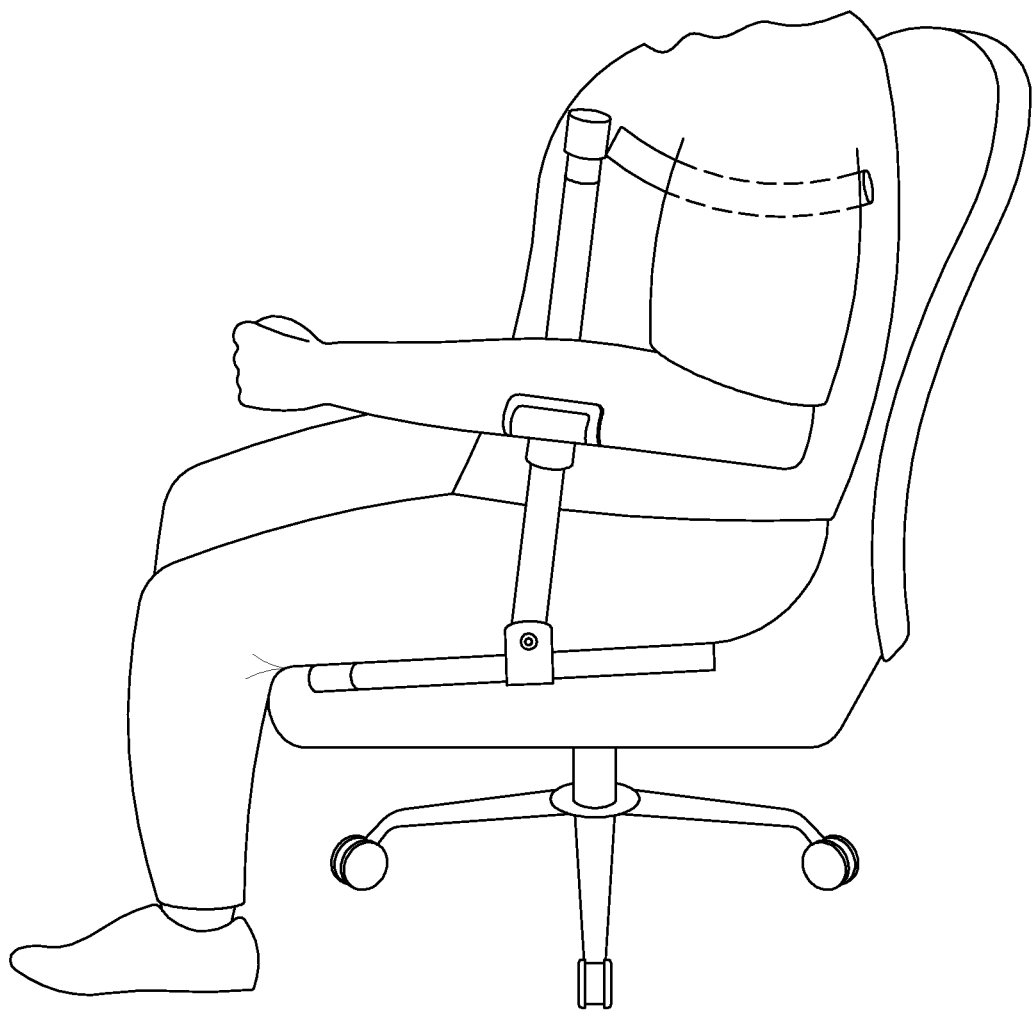
FIG. 1 is a perspective view of a preferred embodiment of the physical support device in the environment of its intended use, placed on a seat adjacent the thigh of the user.
Figure 2:
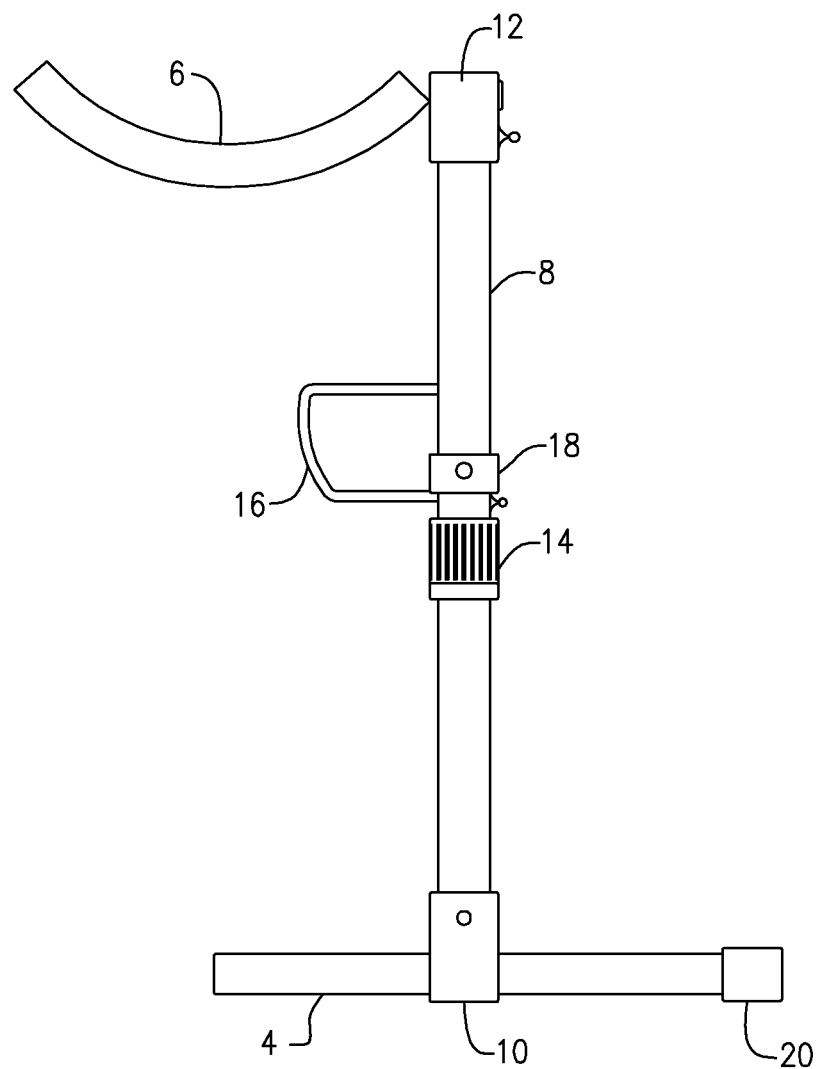
FIG. 2 is a side view of the physical support device of FIG. 1.
Figure 3:
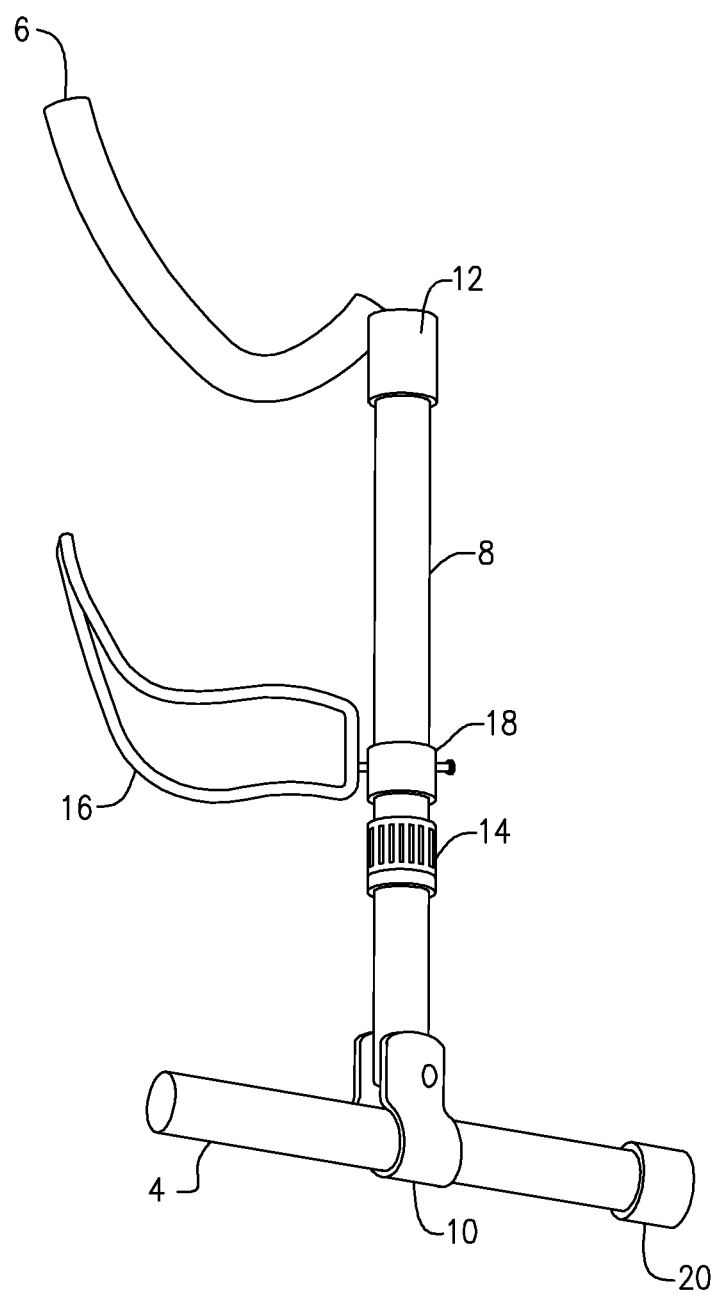
FIG. 3 is a perspective view of the physical support device of FIGS. 1 and 2, showing the pivoting connection of the vertically extending member to the base member, the forearm rest, and arced member extending substantially horizontally from the top of the vertical support member.
Figure 6:
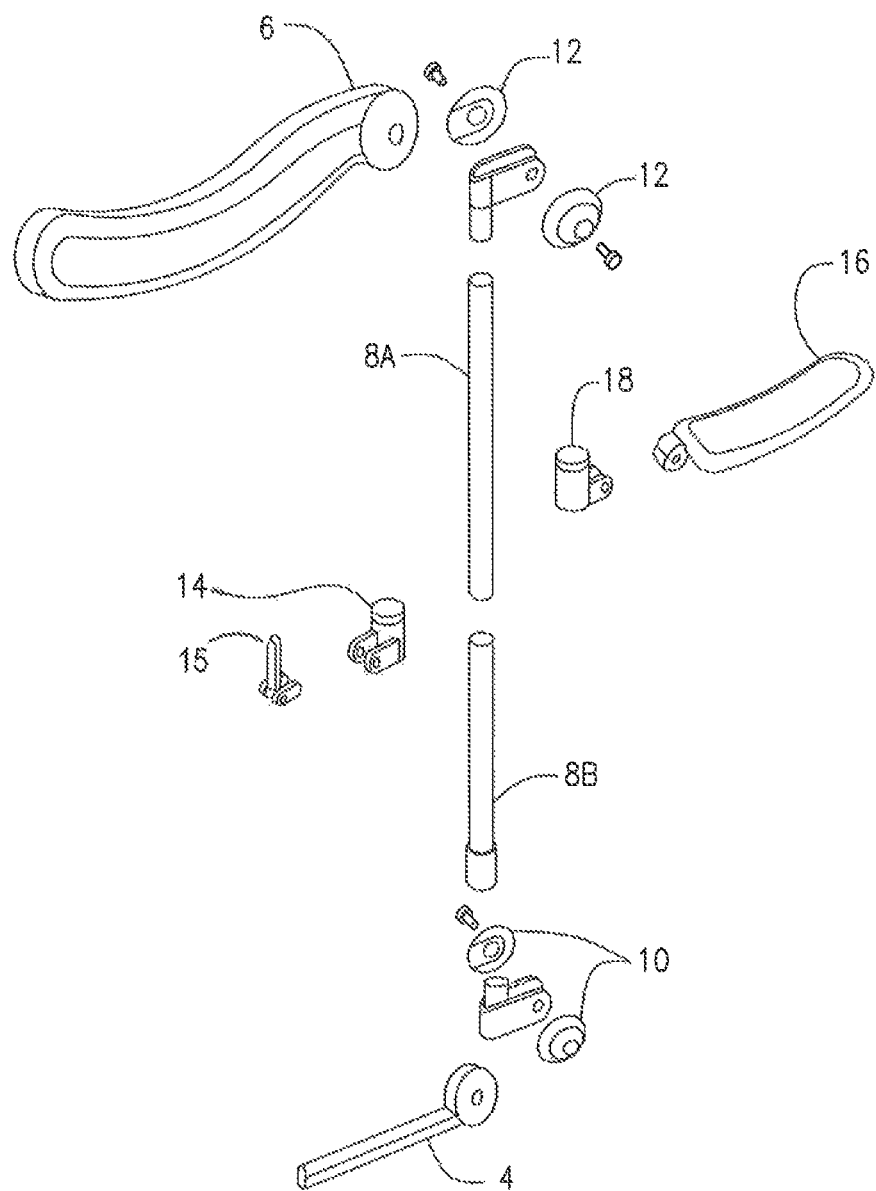
FIG. 6 is an exploded view of the alternative preferred embodiment of FIGS. 4A-B and 5A-B of the present invention.

As shown in the drawings, namely FIGS. 1-3, the present invention is directed to a physical support device 2 for providing physical support to a user in a seated position. The preferred physical support device 2 comprises a base member 4 that is intended to be placed on a seating surface adjacent to the thigh of a user, an arced member 6 that is to be placed under the user's armpit, and a vertical support member 8. A first connection member 10 is placed between the lower portion of the vertical support member 8 and the base member 4 and a second connection member 12 is placed between the upper portion of the vertical support member 8 and the arced member 6.

The vertical support member 8 includes an adjustment mechanism 14 to vary the height of the vertical support member 8. The physical support device 2 further comprises a forearm rest 16 connected to the vertical support member 8, intermediate the base member 4 and the arced member 6.

Figure 7:
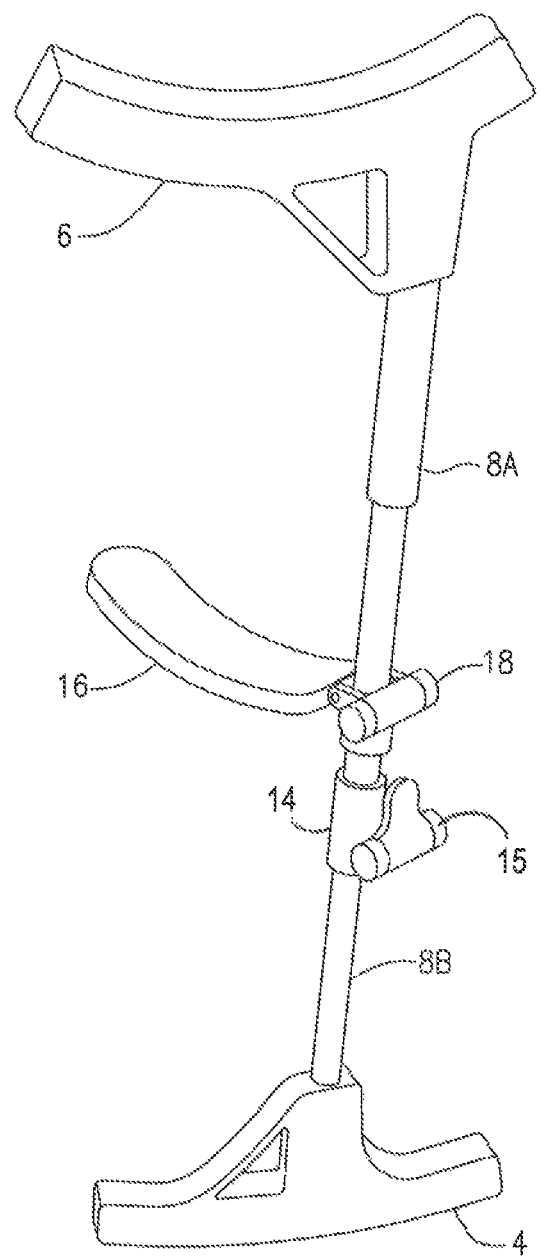
FIG. 7 is a side view of a second alternative embodiment of the present invention wherein the arced member and the base member are coupled directly to the vertical support member in fixed horizontally extending positions.

The arced member 6 preferably extends substantially horizontally from the upper end of the vertical support member 8. In the preferred embodiment shown in FIGS. 2 and 3, the arced member 6 is coupled to the vertical support member 8 by a connection 12 comprising a cap fitted to the top of the vertical member 8. However, any suitable means of connection may be used. For example, the arced member 6 may simply be a unitary extension of the vertical support member 8 instead of a separate piece. Alternatively, in the preferred embodiment shown in FIGS. 4A-C, the arced member 6 is secured to the vertical support member 8 by a connection 12 comprising a pivoting connector, thus allowing the arced member to make a 270° pivot and rest adjacent the vertical support member 8 in a closed configuration as best seen in FIGS. 5A-B. In a second alternative embodiment, shown in FIG. 7, the arced member 6 is connected directly to the upper end of the vertical support section 8A in a fixed, substantially horizontally extending position, without the use of a connection 12.

In the most preferred embodiment, to facilitate comfortable use for extended periods of time, the arced member 6 is padded with the addition of a low-resilience polyurethane foam wrapped in either leather or neoprene, although any other suitable padding alternative, such as cotton, rubber, gel, or silicone, may be used.

The height of the vertical support member 8 should be adjustable to allow the arced member 6 to fit snuggly under the user's armpit, where the arced member 6 can support and displace the weight of the user's arm and torso from the lower back. Therefore, the most preferred vertical support member 8 to which the arced member 6 is attached comprises two vertical support sections 8A and 8B that can move in relation to one another to adjust the height of the vertical support member 8. Most preferably, the vertical support sections 8A and 8B also include a locking element 15 to lock the vertical support sections 8A and 8B into place at a user determinable height, either as part of the vertical support sections or as a separate element.

In its preferred embodiment, the vertical support sections 8A and 8B of the vertical support member 8 are coupled to each other or otherwise cooperate in a manner that provides the vertical support sections 8A and 8B with the ability to be moved relative to one another. These may include twist tightening releases, spring loaded elements that fit within one or a series of openings, threaded connections where turning the sections change the relative height, a locking clamp, a clip, snaps, a pin, a clasp, belts, etc., that permit adjustment and retention of the vertical portions is a user determinable relationship to fix a user adjustable height.

The embodiment shown in FIGS. 2 and 3 utilizes a height adjustment mechanism 14 in the form of a twist tightening release, which is twisted slightly to release pressure and permit the vertical support sections 8A and 8B to slide with relation to one another, and twisted back to lock the vertical support sections 8A and 8B into place. This permits the vertical support member 8 to retain the height of the physical support device 2, and more specifically the distance between the base member 4 and the arced member 6, at a user determinable setting.

In the preferred embodiments as shown in FIGS. 4A-C, 5A-B, and 7, the physical support device 2 employs a height adjustment mechanism 14 in the form of a lever clamp. The height of the support device 2 is preferably retained by pushing the lever against the vertical support member 8, engaging the clamp, and holding the two vertical support sections 8A and 8B in place at a user determined height. Notwithstanding, any suitable elements that function to vary the relationship and lock the vertical support sections 8A and 8B at the user determined height may be used.

At the lower end of the vertical support member 8, the first connection 10 to the base member 4 is preferably a pivotable connector. The preferred first connection 10 permits the vertical support member 8 to move forwards and backwards in the plane of the base member 4, allowing the user more mobility and comfort regardless of the angle of the chair seat. In the most preferred embodiment, the vertical support member 8 is connected to the base member 4 in any suitable manner that allows for the pivotal movement of the vertical member 8 while the base member 4 remains flat, with, for example, a ball joint or axel joint. This feature allows for optimal positioning of the torso and alignment of the spine no matter the angle of the seat base or seat back. In the second alternative embodiment of FIG. 7, however, the lower end of the vertical support section 8B is directly coupled to the base member 4, without the use of a first connection 10. In this embodiment, the base member 4 has a curved bottom surface that allows for the forward and backward rocking of the device 2 on the seat base.

In a first preferred embodiment of FIGS. 1-3, the connection 10 of the preferred embodiment is located substantially at the center of the base member 4. In the alternative preferred embodiment of FIGS. 4A-C and 5A-B, the first connection 10 of the vertical support member 8 is located at one end of the base member 4. This placement of the connection 10 at the end of the base member 4 has the further advantage of allowing the base member to pivot around and come to rest vertically substantially adjacent and virtually parallel to the vertical support member 8 (with the forearm rest 16 optionally therebetween) in a closed configuration for convenient storage and/or transport (see FIGS. 5A and B).

The physical support device 2 further comprises a forearm rest 16 which extends out from the vertical support member 8, preferably in a direction generally between planar and perpendicular to the arced member 6 and the base member 4. The preferred forearm rest 16 is a U-shaped member to better fit the curve of the user's forearm. The forearm rest 16 can be attached to the vertical support member 8 by any suitable means, but preferably comprises a movable connection element which allows for the vertical adjustment of the forearm rest 16 on the vertical support member 8 to a user determinable positon to fit the individual user.

Most preferably, the forearm rest 16 is attached to a sleeve 18 on the vertical support member 8 and preferably includes a locking element such as a screw, spring loaded elements, a clamp, a pin, a clip, a clasp, etc., that may be used to lock the forearm rest 16 at the user determinable height. In this regard, the ideal height of the forearm rest 16 is high enough to relieve the upper body of the weight of the arm. The forearm rest 16 may also be extendable in a horizontal direction away from the vertical support member 8 also so that the user's arm(s) is not confined to the side of the torso; this allows for comfortable positioning and freedom of movement. It is also preferred that the forearm rest 16 be padded, using padding similar to the arced member 6 or another suitable padding.

In the most preferred embodiment, the forearm rest 16 is similarly attached to the vertical support member by a pivotable connection sleeve 18, allowing the forearm rest 16 to pivot upwards to rest substantially adjacent the vertical support member 8. Further, it is preferred that the sleeve 18 attaching the forearm rest 16 to the vertical support member 8 enable the forearm rest to swivel around the vertical member, both allowing for mobility of the user's arm(s) and also permitting the forearm rest to fold up into the closed configuration shown in FIGS. 5A-B.

The base member 4 to which the vertical support member 8 is mounted is to be placed on a seating surface adjacent to the thigh of the user. The base member 4 is preferably fitted or coated, at least in part, with a material or coating to prevent slipping on the seat base, thereby providing added stability. In the embodiment shown in FIGS. 1-3, the base member 4 is fitted with a rubber endcap 20 that finishes the ends of the base member 4 and provides a non-slip function, however, the base member 4 can be formed with a rounded end. The preferred base member 4 has a tubular or cylindrical configuration to allow it to tilt to a comfortable position, however, any suitable configuration may be used.

In the preferred embodiment, the base member 4, the vertical support member 8, and the arced member 6 are made of a polymer plastic, which provides durability and lightweight mobility. While any suitable material may be used to create the device, it is preferred that the materials be both durable and light weight, to ensure benefits such as easy transport. For example, metals such as aluminum, titanium or the like may be used, along with such materials as fiberglass, carbon fiber materials, wood, etc.

Variations, modifications, and alterations to the preferred embodiment of the present invention described above will make themselves apparent to those skilled in the art. All such changes are intended to fall within the spirit and scope of the present invention, limited solely by the appended claims.

Any and all patents and/or patent applications referred to herein are hereby incorporated by reference.

I claim:

1. A physical support device for providing physical support to a person in a sitting position, comprising:
 a. a base member having a slip-resistant bottom surface adapted to be placed on a seating platform surface adjacent to a seated user;
 b. an arced member that is to be placed under the user's armpit;
 c. a vertical support member comprising a lower end coupled to the base member and an upper end coupled to the arced member, wherein the vertical support member has a height;
 d. an adjustment mechanism to vary the height of the vertical support member to a user-determinable height; and
 e. a forearm rest associated with the vertical support member intermediate the base member and the arced member, the forearm rest having a first end and a second end, the first end cooperating with an adjustable rest connection for movement of the forearm rest relative to the vertical support member,
 wherein the base member, arced member, vertical support and forearm rest are adapted to support one side of a user's body.

2. The physical support device of claim 1 wherein the base member further comprises a non-slip covering or coating.

3. The physical support device of claim 1 wherein the arced member further comprises a cushion.

4. The physical support device of claim 1 wherein the vertical support member is comprised of two or more vertical sections for adjustment of the vertical support member to a user determinable height.

5. The physical support device of claim 4 wherein the vertical support member further comprises an adjustable attachment member cooperating with the vertical support sections taken from the group consisting of screw elements, twist tightening elements, a spring loaded catch cooperating with a series of openings, a clamp, a pin, a clasp, snaps and a belt.

6. The physical support device of claim 4 further comprising a locking element to lock the vertical sections into place at the user determinable height.

7. The physical support device of claim 6 wherein the locking element is a clamp.

8. The physical support device of claim 1 further comprising a pivotable connector between the arced member and the upper end of the vertical support member for allowing the arced member to pivot about 270° and fold into a closed configuration.

9. The physical support device of claim 1 wherein the forearm rest further comprises a cushion.

10. The physical support device of claim 1 wherein the movement of the forearm rest relative to the vertical support member is a vertical movement for adjusting the height of the forearm rest relative to the vertical support member.

11. The physical support device of claim 1 wherein the movement of the forearm rest relative to the vertical support member is taken from the group consisting of vertical movement, horizontal movement and combinations of vertical movement and horizontal movement relative to the vertical support member for adjusting one or more of the axial and radial orientation of the forearm rest relative to the vertical support member.

12. The physical support device of claim 1 further comprising a horizontal extension for horizontal adjustment of the forearm rest closer to or father from the vertical support member.

13. The physical support device of claim 1 wherein the adjustable rest connection includes a releasable attachment for removal of the forearm rest from the vertical support member.

14. The physical support device of claim 1 wherein the adjustable rest connection further comprises a pivot that allows the forearm rest to fold into a closed configuration substantially adjacent to the vertical support member.

15. The physical support device of claim 1 wherein the base member is coupled to the lower end of the vertical support member in a fixed relationship.

16. The physical support device of claim 1 wherein the arced member is coupled to the upper end of the vertical support member in a fixed relationship.

17. A physical support device for providing physical support to a person in a sitting position, comprising:
 a. a base member having a slip-resistant bottom surface adapted to be placed on a seating platform surface adjacent to a seated user;
 b. an arced member that is to be placed under the user's armpit;
 c. a vertical support member comprising a lower end coupled to the base member and an upper end coupled to the arced member, wherein the vertical support member has a height;
 d. an adjustment mechanism to vary the height of the vertical support member to a user-determinable height; and
 e. a forearm rest associated with the vertical support member intermediate the base member and the arced member,
 wherein the base member, arced member, vertical support and forearm rest are adapted to support one side of a user's body, further comprising a pivotable connector between the base member and the lower end of the vertical support member for allowing the vertical support member to lean forward or backward.

18. The physical support device of claim 17 wherein the pivotable connector is located at one end of the base member allowing the base member to pivot about 270° and fold into a closed configuration.

19. A physical support device for providing physical support to a person in a sitting position, comprising:
 a. a base member having a slip-resistant, curved bottom surface adapted to be placed on a seating platform surface adjacent to a seated user;
 b. an arced member that is to be placed under the user's armpit;
 c. a vertical support member comprising a lower end coupled to the base member and an upper end coupled to the arced member, wherein the vertical support member has a height;
 d. an adjustment mechanism to vary the height of the vertical support member to a user-determinable height; and
 e. an adjustable forearm rest a forearm rest associated with the vertical support member intermediate the base member and the arced member,
 wherein the base member, arced member, vertical support and forearm rest are adapted to support one side of a user's body.

20. The physical support device of claim 19 wherein the forearm rest cooperates with an adjustable rest connection for movement of the forearm rest relative to the vertical support member consisting of vertical movement, horizontal movement and combinations of vertical movement and horizontal movement relative to the vertical support member for adjusting one or more of the axial and radial orientation of the forearm rest relative to the vertical support member.

* * * * *